United States Patent
Harada et al.

(10) Patent No.: US 8,233,909 B2
(45) Date of Patent: Jul. 31, 2012

(54) RECEPTION CYCLE CONTROL METHOD, RADIO BASE STATION, AND MOBILE STATION

(75) Inventors: Atsushi Harada, Kawasaki (JP); Anil Umesh, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 427 days.

(21) Appl. No.: 12/598,300

(22) PCT Filed: May 1, 2008

(86) PCT No.: PCT/JP2008/058367
§ 371 (c)(1),
(2), (4) Date: Jan. 14, 2010

(87) PCT Pub. No.: WO2008/139956
PCT Pub. Date: Nov. 20, 2008

(65) Prior Publication Data
US 2010/0130216 A1    May 27, 2010

(30) Foreign Application Priority Data
May 1, 2007  (JP) .............................. P2007-121195

(51) Int. Cl.
*H04W 72/00* (2009.01)
(52) U.S. Cl. .................... 455/450; 455/509; 455/422.1; 455/452.1
(58) Field of Classification Search .......... 455/450, 455/509, 422.1, 452.1
See application file for complete search history.

(56) References Cited

U.S. PATENT DOCUMENTS

| | | | |
|---|---|---|---|
| 2008/0279171 A1* | 11/2008 | Kim et al. | 370/346 |
| 2010/0278051 A1* | 11/2010 | Larmo et al. | 370/242 |
| 2011/0019568 A1* | 1/2011 | Kim et al. | 370/252 |
| 2011/0019756 A1* | 1/2011 | Chun et al. | 375/260 |

FOREIGN PATENT DOCUMENTS

| | | |
|---|---|---|
| JP | 2001-500325 A | 1/2001 |
| JP | 2004-501569 A | 1/2004 |
| WO | 97/37504 A1 | 10/1997 |
| WO | 01/99353 A1 | 12/2001 |

OTHER PUBLICATIONS

3GPP TSG-RAN WG2 Meeting #57bis, "Summary of email discussion on DRX control," R2-071553, Mar. 2007, 33 pages.
International Search Report issued in PCT/JP2008/058367, mailed on Aug. 26, 2008, with translation, 3 pages.
Written Opinion issued in PCT/JP2008/058367, mailed on Aug. 26, 2008, 3 pages.

* cited by examiner

*Primary Examiner* — Barry Taylor
(74) *Attorney, Agent, or Firm* — Osha Liang LLP (57) ABSTRACT

A radio base station (eNB) is configured to start the transmitting-side timer and a Polling timer which is set to expire earlier than the transmitting-side, upon transmission of a last piece of downlink data accumulated in a transmission buffer to the mobile station. When the Polling timer expires, the radio base station (eNB) notifies the mobile station (UE) of the expiration, and restarts the transmitting-side timer, and the mobile station (UE) restarts a receiving-side timer in response to the notification.

9 Claims, 5 Drawing Sheets

RECEPTION CYCLE CONTROL METHOD, RADIO BASE STATION, AND MOBILE STATION

TECHNICAL FIELD

The present invention relates to a reception cycle control method for enabling a mobile station and a radio base station to control a reception cycle in the mobile station of downlink data to be transmitted from the radio base station to the mobile station, and relates to the mobile station and the radio base station.

BACKGROUND ART

3GPP, which is a group working on standardization of the third generation mobile communication system, has been conducting studies collectively called "LTE (Long Term Evolution)" in order to achieve significant increase in transmission speed and reduction in transmission delay in a radio access network (RAN: Radio Access Network), and has been pursuing formulation of standardized specifications for constituent technologies relating to the studies.

Additionally, a radio access scheme based on the LTE or the like is configured to employ a DRX (Discontinuous Reception) technology in order to save power consumption in a mobile station UE.

Specifically, in a mobile communication system based on the LTE scheme, a radio base station eNB and a mobile station UE are both configured to change reception cycles of downlink data in the mobile station UE by use of Inactive timers.
Non-patent Document 1: 3GPP TSG RAN WG2 Meeting #57bis R2-071553 (Mar. 26, 2007)

DISCLOSURE OF THE INVENTION

However, the above described conventional mobile communication system based on the LTE scheme has a problem that downlink data loss is likely to occur due to disagreement between "a reception cycle of downlink data (a continuous reception cycle or a DRX cycle (discontinuous reception cycle)) in a mobile station UE" that is managed by a radio base station eNB, and "a reception cycle of downlink data in the mobile station UE" that is managed by the mobile station UE.

Here, an example of the above case will be described with reference to FIG. 1.

Figure 1:
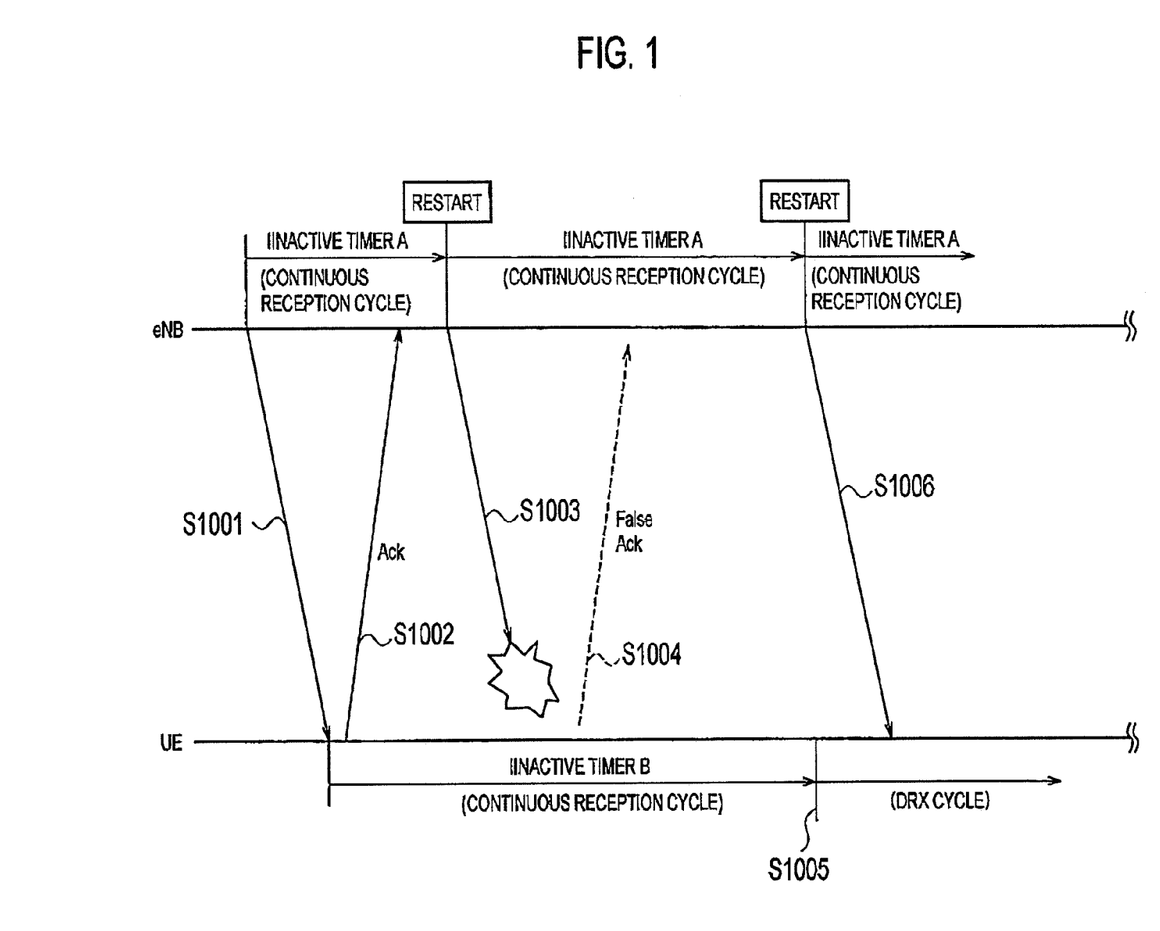
FIG. 1 is a diagram for explaining operations of a conventional mobile communication system.

As shown in FIG. 1, in step S1001, upon occurrence of downlink data addressed to a mobile station UE, a radio base station eNB transmits a notification to the mobile station UE through an L1/L2 control channel. At this time, the mobile station UE is operating in a continuous reception cycle and this notification announces an assignment of a transmission opportunity in a downlink shared channel (for example, a DL-SCH: Downlink Shared Channel) used for transmitting the downlink data addressed to the mobile station UE. Thereafter, the radio base station eNB transmits the downlink data addressed to the mobile station UE, to the mobile station UE through the above transmission opportunity in the downlink shared channel, and starts an Inactive timer A for the mobile station UE.

Here, a reception cycle of downlink data in the mobile station UE that is managed by the radio base station eNB is a continuous reception cycle.

In step S1002, when receiving the above described downlink data, the mobile station UE operating in the continuous reception cycle starts an Inactive timer B, and transmits a transmission acknowledgment signal (Ack) for the downlink data, through an uplink shared channel.

In step S1003, upon occurrence of downlink data addressed to the mobile station UE, the radio base station eNB transmits a notification to the mobile station UE, which is operating in the continuous reception cycle, through the L1/L2 control channel, the notification announcing an assignment of a transmission opportunity in the downlink shared channel used for transmitting the downlink data addressed to the mobile station UE. Thereafter, the radio base station eNB transmits the downlink data addressed to the mobile station UE, to the mobile station UE through the above transmission opportunity in the downlink shared channel, and restarts (re-starts) the Inactive timer A for the mobile station UE.

Here, the mobile station UE operating in the continuous reception cycle fails to receive the notification transmitted from the radio base station eNB through the L1/L2 control channel. For this reason, the mobile station UE cannot detect that the above described downlink data has been transmitted, so that the mobile station UE can neither receive the downlink data nor transmit a transmission acknowledgment signal (Ack/Nack) for the downlink data.

Meanwhile, in step S1004, even though the mobile station UE has transmitted no transmission acknowledgment signal (Ack/Nack) for the above described downlink data, the radio base station eNB determines that the radio base station eNB has received a transmission acknowledgment signal (Ack) for the downlink data (in a False Ack state).

Thereafter, in step S1005, the mobile station UE operating in the continuous reception cycle changes the reception cycle of the downlink data from the continuous reception cycle to a DRX cycle, because the mobile station UE has received no downlink data during a period from the start to expiration of the Inactive timer B.

Here, since the Inactive timer A for the mobile station UE has not yet expired (because the Inactive timer A has been restarted in step S1003), the reception cycle of the downlink data in the mobile station UE that is managed by the radio base station eNB remains to be the continuous reception cycle.

Accordingly, in step S1006, upon occurrence of downlink data addressed to the mobile station UE, the radio base station eNB transmits a notification to the mobile station UE, which is operating in the continuous reception cycle, through the L1/L2 control channel, the notification announcing an assignment of a transmission opportunity in the downlink shared channel used for transmitting the downlink data addressed to the mobile station UE. Thereafter, the radio base station eNB transmits the downlink data addressed to the mobile station UE, to the mobile station UE through the above transmission opportunity in the downlink shared channel, and restarts the Inactive timer A for the mobile station UE.

However, the mobile station UE is operating in the DRX reception cycle, and therefore cannot receive the downlink data.

Thus, the present invention was made in consideration of the above described problem, and an object thereof is to provide a reception cycle control method, a radio base station and a mobile station which can reduce a possibility of downlink data loss occurring due to disagreement between "a reception cycle of downlink data in a mobile station UE" that is managed by a radio base station eNB, and "a reception cycle of downlink data in the mobile station UE" that is managed by the mobile station UE.

A first aspect of the present invention is summarized as a reception cycle control method in which a mobile station and a radio base station control a downlink data reception cycle in the mobile station for downlink data to be transmitted from the radio base station to the mobile station, including the steps of: (A) starting, at the radio base station, a transmitting-side timer upon transmission of downlink data to the mobile station; (B) changing, at the radio base station, a reception cycle of downlink data in the mobile station, when transmitting no downlink data during a period from start to expiration of the transmitting-side timer; (C) starting, at the mobile station, a receiving-side timer upon receipt of downlink data transmitted from the radio base station; and (D) changing, at the mobile station, a reception cycle of downlink data in the mobile station, when receiving no downlink data during a period from start to expiration of the receiving-side timer; wherein upon transmission of a last piece of downlink data accumulated in a transmission buffer to the mobile station, the radio base station starts both of a Polling timer and the transmitting-side timer, the Polling timer set to expire earlier than the transmitting-side timer and the receiving-side timer; when the Polling timer expires, the radio base station notifies the mobile station of the expiration, and restarts the transmitting-side timer; and the mobile station restarts the receiving-side timer in response to the notification.

In the first aspect, in the steps (B) and (D), the reception cycle of the downlink data in the mobile station can be changed from a continuous reception cycle to a first discontinuous reception cycle.

In the first aspect, in the steps (B) and (D), the reception cycle of the downlink data in the mobile station can be changed from a first discontinuous reception cycle to a second discontinuous reception cycle set to be longer than the first discontinuous reception cycle.

A second aspect of the present invention is summarized as a radio base station used in a mobile communication system in which a mobile station is configured to start a receiving-side timer upon receipt of downlink data transmitted from a radio base station, and to change a reception cycle of downlink data in the mobile station when receiving no downlink data during a period from start to expiration of the receiving-side timer, the radio base station including: a transmitting-side timer manager unit configured to start a transmitting-side timer upon transmission of downlink data to the mobile station; a reception cycle controller unit configured to change the reception cycle of the downlink data in the mobile station, when no downlink data is transmitted during a period from start to expiration of the transmitting-side timer; a Polling timer manager unit configured to start a Polling timer set to expire earlier than the transmitting-side timer, when a last piece of downlink data accumulated in a transmission buffer is transmitted to the mobile station; and a notifying unit configured to notify, to the mobile station, expiration of the Polling timer, when the Polling timer expires; wherein the transmitting-side timer manager unit is configured to restart the transmitting-side timer, when the Polling timer expires.

In the second aspect, when no downlink data is transmitted during a period from start to expiration of the transmitting-side timer, the reception cycle controller unit can be configured to change the reception cycle of the downlink data in the mobile station from a continuous reception cycle to a first discontinuous reception cycle.

In the second aspect, when no downlink data is transmitted during a period from start to expiration of the transmitting-side timer, the reception cycle controller unit can be configured to change the reception cycle of the downlink data in the mobile station from a first discontinuous reception cycle to a second discontinuous reception cycle set to be longer than the first discontinuous reception cycle.

A third aspect of the present invention is summarized as a mobile station used in a mobile communication system in which the radio base station is configured to start the transmitting-side timer upon transmission of downlink data to the mobile station, to change a reception cycle of downlink data in the mobile station when transmitting no downlink data during a period from start to expiration of the transmitting-side timer, to start a Polling timer upon transmission of a last piece of downlink data accumulated in a transmission buffer to the mobile station, and to notify, to the mobile station, expiration of the Polling timer when the Polling timer expires, the mobile station including: a receiving-side timer manager unit configured to start a receiving-side timer set to expire later than the Polling timer, when the mobile station receives downlink data transmitted from the radio base station; and a reception cycle controller unit configured to change the reception cycle of the downlink data in the mobile station, when no downlink data is received during a period from start to expiration of the receiving-side timer; wherein the receiving-side timer manager unit is configured to restart the receiving-side timer in response to the notification from the radio base station.

In the third aspect, when no downlink data is received during a period from start to expiration of the receiving-side timer, the reception cycle controller unit can be configured to change the reception cycle of the downlink data in the mobile station from a continuous reception cycle to a first discontinuous reception cycle.

In the third aspect, when no downlink data is received during a period from start to expiration of the receiving-side timer, the reception cycle controller unit can be configured to change the reception cycle of the downlink data in the mobile station from a first discontinuous reception cycle to a second discontinuous reception cycle set to be longer than the first discontinuous reception cycle.

As has been described above, the present invention can provide a reception cycle control method, a radio base station and a mobile station which are capable of reducing a possibility of downlink data loss occurring due to disagreement between "a reception cycle of downlink data in a mobile station UE" that is managed by a radio base station eNB, and "a reception cycle of downlink data in the mobile station UE" that is managed by the mobile station UE.

BEST MODE FOR CARRYING OUT THE INVENTION

Configuration of Mobile Communication System According to First Embodiment of the Present Invention A configuration of a mobile communication system according to a first embodiment of the present invention will be described with reference to FIGS. 2 to 5.

Figure 2:
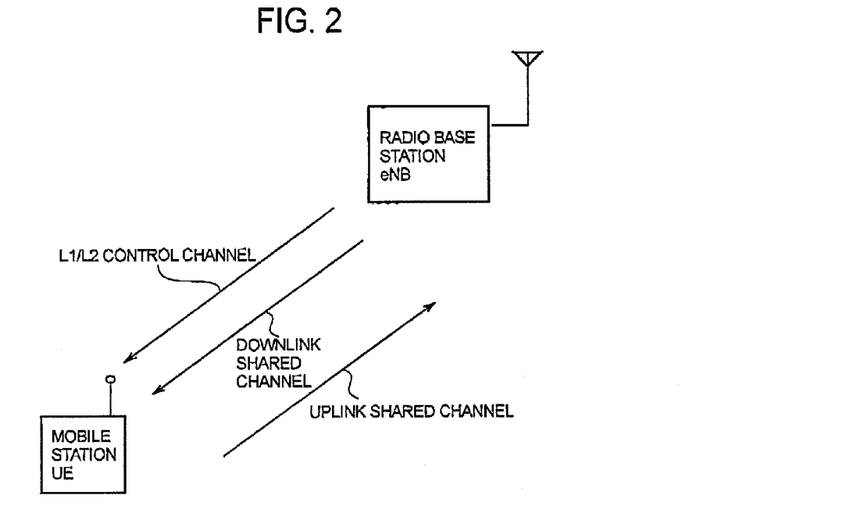
FIG. 2 is an overall configuration diagram of a mobile communication system according to a first embodiment of the present invention.

Note that, although the present embodiment will be described by taking as an example a mobile communication system including an LTE/SEA (System Architecture Evolution)-based architecture which is promoted by the 3GPP in standardization, as shown in FIG. 2, the present invention is not limited to this mobile communication system, and is also applicable to a mobile communication system including other architectures.

The mobile communication system according to the present embodiment includes a radio base station eNB and a mobile station UE as shown in FIG. 2.

The radio base station eNB is configured to notify, to a mobile station UE through an L1/L2 control channel, an assignment of a transmission opportunity in a downlink shared channel used for transmitting downlink data addressed to the mobile station UE.

Additionally, the radio base station eNB is configured to transmit downlink data to a mobile station UE through the transmission opportunity in the downlink shared channel that is assigned to the mobile station UE, the downlink data being addressed to the mobile station UE.

Additionally, the mobile station UE is configured to transmit uplink data (such as, for example, user data or a transmission acknowledgment signal for downlink data) through an uplink shared channel.

Figure 3:
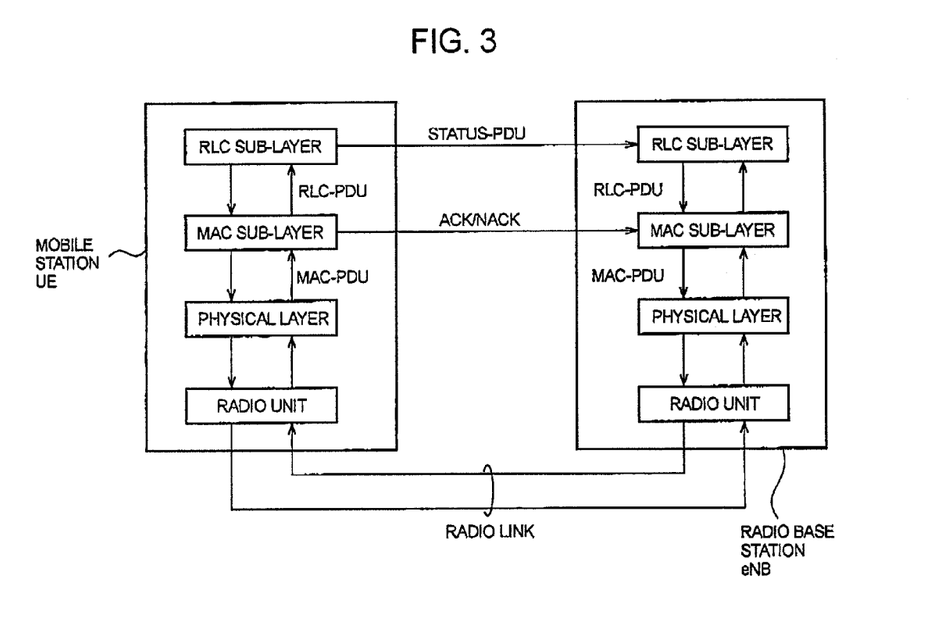
FIG. 3 is a diagram showing protocol layer configurations in a radio access network in the mobile communication system according to the first embodiment of the present invention.

As shown in FIG. 3, the mobile communication system according to the present embodiment is configured so that an RLC retransmission control processing may be performed between an RLC (Radio Link Control) sub-layer in the mobile station UE and an RLC sub-layer in the radio base station eNB.

Specifically, the RLC sub-layer in the mobile station UE is configured to transmit back a STATUS-PDU, when an RLC-PDU having a Polling bit set therein is received from the radio base station eNB, the STATUS-PDU containing a transmission acknowledgment signal responding to any RLC-PDU within a predetermined range.

Additionally, the mobile communication system according to the present embodiment is configured so that a HARQ retransmission control processing is performed between a MAC (Medium Access Control) sub-layer in the mobile station UE and a MAC sub-layer in the radio base station eNB.

Figure 4:
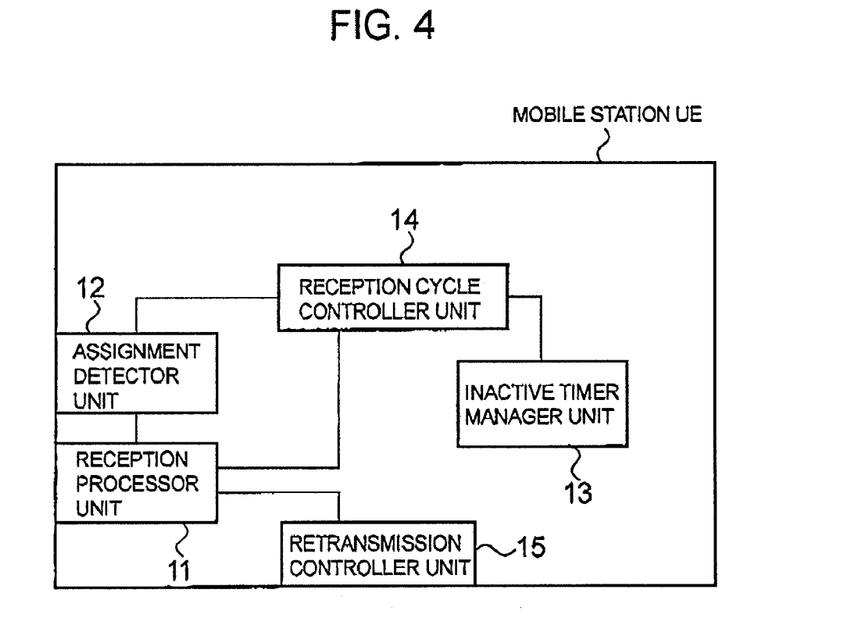
FIG. 4 is a functional block diagram of a mobile station according to the first embodiment of the present invention.

As shown in FIG. 4, the mobile station UE according to the present embodiment includes a reception processor unit 11, an assignment detector unit 12, an Inactive timer manager unit 13, a reception cycle controller unit 14 and a retransmission controller unit 15.

The assignment detector unit 12 is configured to monitor the L1/L2 control channel, and to detect that a transmission opportunity in a downlink shared channel used for transmitting downlink data addressed to the mobile station UE is assigned to the mobile station UE.

Here, the assignment detector unit 12 is configured to change a cycle (timing) to monitor the L1/L2 control channel, on the basis of a reception cycle of downlink data in the mobile station UE that is managed by the reception cycle controller unit 14.

The reception processor unit 11 is configured to perform reception processing on downlink data, when the assignment detector unit 12 detects that a transmission opportunity in a downlink shared channel is assigned to the mobile station UE, the downlink data being addressed to the mobile station UE and transmitted from the radio base station eNB in the above transmission opportunity.

The reception cycle controller unit 14 is configured to control the reception cycle of the downlink data in the mobile station UE.

Specifically, the reception cycle controller unit 14 is configured to change the reception cycle of the downlink data in the mobile station UE, when no downlink data is received during a period from the start to expiration of an Inactive timer B (a receiving-side timer).

For example, the reception cycle controller unit 14 may be configured to change the reception cycle of the downlink data in the mobile station UE from the continuous reception cycle to a first DRX cycle, when the mobile station UE is operating in a continuous reception cycle and receives no downlink data during a period from the start to expiration of the Inactive timer B.

Additionally, the reception cycle controller unit 14 may be configured to change the reception cycle of the downlink data in the mobile station UE from the first DRX cycle to a second DRX cycle (second discontinuous reception cycle), when the mobile station UE is operating in the first DRX cycle and receives no downlink data during a period from the start to expiration of the Inactive timer B. Here, it is assumed that the second DRX cycle is set to be longer than the first DRX cycle.

The Inactive timer manager unit 13 is configured to manage the Inactive timer B.

For example, the Inactive timer manager unit 13 is configured to start the Inactive timer B, when downlink data transmitted from the radio base station eNB is received.

Here, when the assignment detector unit 12 detects that a transmission opportunity in the downlink shared channel is assigned to the mobile station UE, the Inactive timer manager unit 13 may determine that downlink data transmitted from the radio base station eNB is received. Instead, when the reception processor unit 11 successfully completes reception processing (for example, error correction decoding processing) on downlink data addressed to the mobile station UE, the Inactive timer manager unit 13 may determine that downlink data transmitted from the radio base station eNB is received.

The Inactive timer manager unit 13 is also configured to restart the Inactive timer B, in accordance with notification (notification that a Polling timer for the mobile station UE has expired) transmitted from the radio base station eNB.

Additionally, the Inactive timer manager unit 13 is configured to set the Inactive timer B, so that the Inactive timer B may expire later than the above described Polling timer used for the mobile station UE.

The retransmission controller unit 15 is configured to perform RLC retransmission control processing between itself and the RLC sub-layer in the radio base station eNB.

Specifically, in an RLC sub-layer, the retransmission controller unit 15 is configured to transmit back a STATUS-PDU, when downlink data (an RLC-PDU) having a Polling bit set therein is received from the base station eNB, the STATUS-PDU containing a transmission acknowledgment signal for any RLC-PDU within a predetermined range.

Additionally, the retransmission controller unit 15 is configured to perform a HARQ retransmission control processing between itself and the MAC sub-layer in the radio base station eNB.

Specifically, in the MAC sub-layer, the retransmission controller unit 15 is configured to transmit a transmission acknowledgment signal (Ack) for downlink data addressed to the mobile station UE, when reception processing (for example, error correction decoding processing) on the downlink data is successfully completed, and configured to transmit a transmission acknowledgment signal (Nack) for downlink data addressed to the mobile station UE, when reception processing (for example, error correction decoding processing) on the downlink data ends up with a failure.

Figure 5:
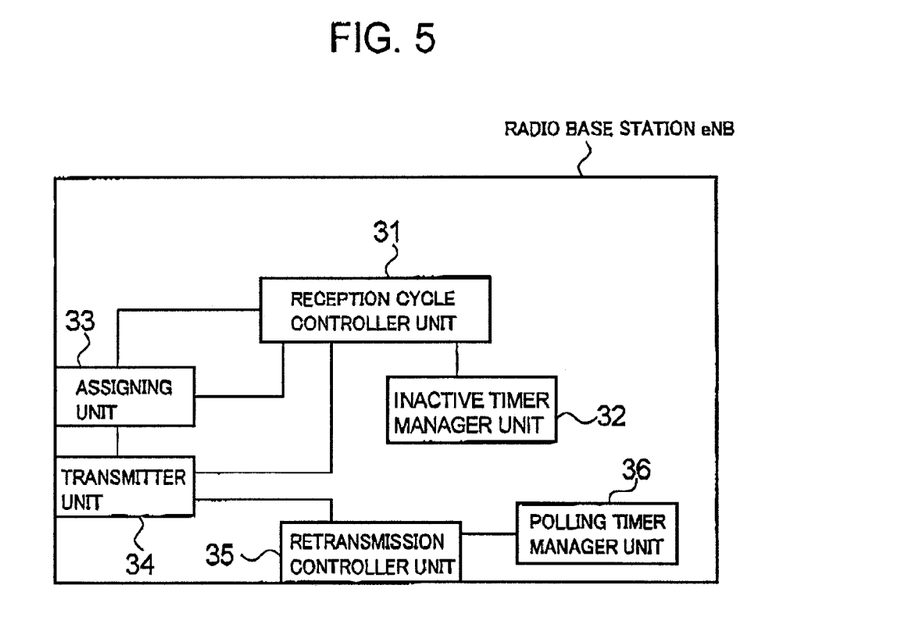
FIG. 5 is a functional block diagram of a radio base station according to the first embodiment of the present invention.

As shown in FIG. 5, the radio base station eNB includes a reception cycle controller unit 31, an Inactive timer manager unit 32, an assigning unit 33, a transmitter unit 34, a retransmission controller unit 35 and a Polling timer manager unit 36.

The assigning unit 33 is configured to transmit a notification to the mobile station UE through an L1/L2 control channel, upon occurrence of downlink data addressed to a mobile station UE. This notification announces an assignment of a transmission opportunity in a downlink shared channel used for transmitting downlink data addressed to the mobile station UE.

Note that the assigning unit 33 is configured to make the above notification, by taking the reception cycle of the downlink data in the mobile station UE into consideration.

The transmitter unit 34 is configured to transmit downlink data addressed to the mobile station UE, to a mobile station UE through a transmission opportunity in a downward shared channel assigned by the assigning unit 33 to the mobile station UE.

The reception cycle controller unit 31 is configured to control a reception cycle of downlink data in each mobile station UE.

Specifically, the reception cycle controller unit 31 is configured to change, when the transmitter unit 34 transmits no downlink data to a certain mobile station UE during a period from the start to expiration of an Inactive timer A (a transmitting-side timer) for the mobile station UE, the reception cycle of the downlink data in the mobile station UE.

For example, for a certain mobile station UE operating in the continuous reception cycle, the reception cycle controller unit 31 may be configured to change the reception cycle of the downlink data in the mobile station UE from the continuous reception cycle to the first DRX cycle, when the transmitter unit 34 transmits no downlink data to the mobile station UE during a period from the start to expiration of the Inactive timer A for the mobile station UE.

Additionally, for a certain mobile station UE operating in the first DRX cycle, the reception cycle controller unit 31 may be configured to change the reception cycle of the downlink data in the mobile station UE from the first DRX cycle to the second DRX cycle, when the transmitter unit 34 transmits no downlink data to the mobile station UE during a period from the start to expiration of the Inactive timer A for the mobile station UE.

The Polling timer manager unit 36 is configured to start a Polling timer used for the mobile station UE, when a last piece of downlink data (RLC-PDUs) accumulated in a transmission buffer for each mobile station UE and retained in the radio base station eNB is transmitted to the mobile station UE.

Additionally, the Polling timer manager unit 36 is configured to stop, when a STATUS-PDU is received from a mobile station UE, a Polling timer used for the mobile station UE.

The Inactive timer manager unit 32 is configured to manage an Inactive timer A for each mobile station UE.

For example, the Inactive timer manager unit 32 is configured to start an Inactive timer A for a certain mobile station UE, when downlink data is transmitted to the certain mobile station UE.

Additionally, the Inactive timer manager unit 32 is configured to restart an Inactive timer A for a mobile station UE, when a Polling timer used for the mobile station UE expires.

Additionally, the Inactive timer manager unit 32 is configured to set an Inactive timer A for a mobile station UE, so that the Inactive timer A may expires later than a Polling timer used for the mobile station UE.

The retransmission controller unit 35 is configured to perform RLC retransmission control processing between itself and an RLC sub-layer in each mobile station UE.

Specifically, when the last piece of downlink data (RLC-PDU) accumulated in a transmission buffer used for each mobile station UE in the radio base station eNB is transmitted from an RLC sub-layer to the mobile station UE, the retransmission controller unit 35 is configured to set a Polling bit in the downlink data (RLCPDU).

Additionally, the retransmission controller unit 35 is configured to perform a HARQ retransmission control processing between itself and a MAC sub-layer in each mobile station UE.

Specifically, when an MAC sub-layer receives a transmission acknowledgment signal (Nack) for particular downlink data (a MAC-PDU) from a mobile station UE through an uplink shared channel, the retransmission controller unit 35 is configured to retransmit the downlink data (the MAC-PDU).

In addition, the retransmission controller unit 35 is configured to notify, to each mobile station UE, expiration of a Polling timer, when the Polling timer used for the mobile station UE expires.

Note that a part or all of functions (modules) constituting the mobile station UE shown in FIG. 4 and the radio base station eNB shown in FIG. 5 may be configured to be implemented by any one or a combination of a general-purpose processor, a DSP (Digital Signal Processor), an ASIC (Application Specific Integrated Circuit), a FPGA (Field Programmable Gate Array), a discrete gate, transistor logic, and a discrete hardware component, or the like.

Figure 7:
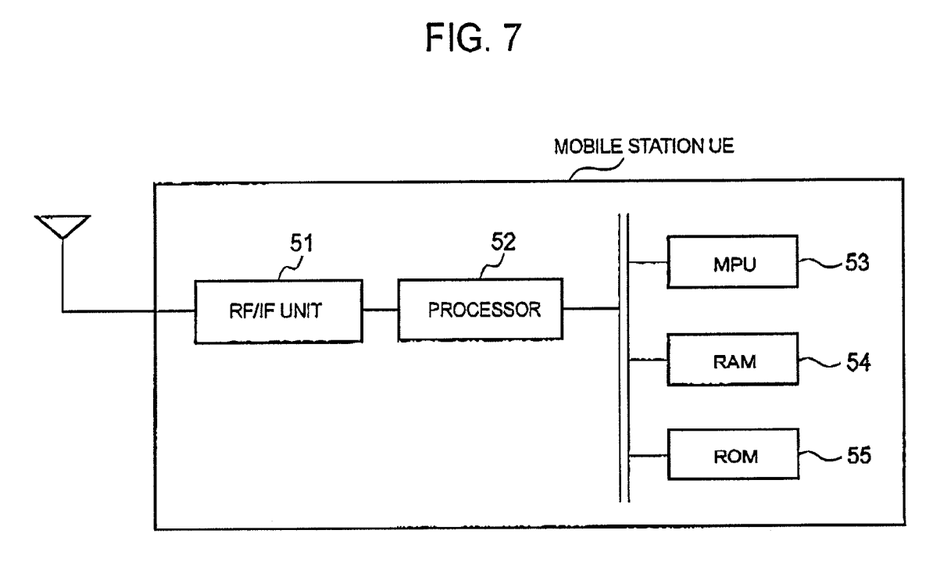
FIG. 7 is a diagram showing one example of a hardware configuration of the mobile station according to the embodiment of the present invention.

For example, a description will be given, as an example, of a case where the mobile station UE includes an RF/IF unit 51 which performs radio signal processing, a processor 52 which performs baseband signal processing, an MPU (Micro Processing Unit) 53 which executes an application, a RAM (Random Access Memory) 54 and a ROM (Read Only Memory) 55 as shown in FIG. 7.

In this case, the processor 52 of the mobile station UE may be composed of any one or a combination of a general-purpose processor, a DSP, an ASIC, a FPGA, a discrete gate, transistor logic, and a discrete hardware component, or the like in order to implement a part or all of the functions (modules) constituting the mobile station UE shown in FIG. 4 Note that, although the mobile station UE has been described here as an example, the radio base station eNB may be configured so that apart or all of the functions (modules) constituting the radio base station eNB shown in FIG. 5 may be implemented by a processor having the above described configuration.

Here, the general-purpose processor may be a micro processor, or may be a conventional processor, a controller, a micro controller or a state machine.

Additionally, the processor may be implemented as a combination of any computing devices such as a combination of a DSP and a micro processor, a combination of plural micro processors, a combination of one or plural micro processors and a DSP core, or the like.

(Operations of Mobile Communication System According to First Embodiment of the Present Invention)

Operations of the mobile communication system according to the first embodiment of the present invention will be described with reference to FIG. 6.

Figure 6:
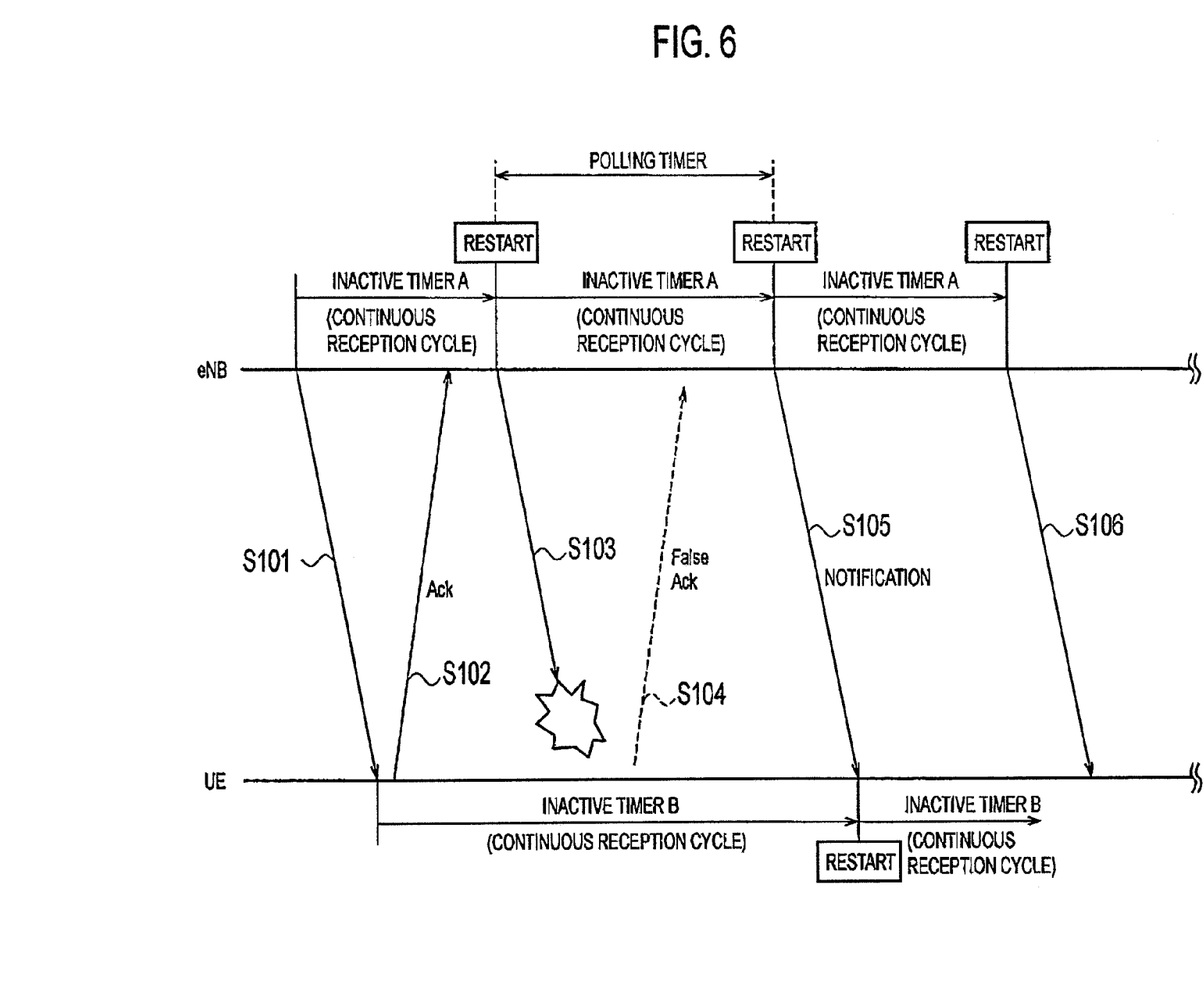
FIG. 6 is a diagram for explaining operations of the mobile communication system according to the first embodiment of the present invention.

As shown in FIG. 6, in step S101, upon occurrence of downlink data addressed to a mobile station UE, the radio base station eNB transmits a notification to a mobile station UE, operating in a continuous reception cycle, through an L1/L2 control channel, the notification announcing an assignment of a transmission opportunity in a downlink shared channel used for transmitting downlink data addressed to the mobile station UE. Thereafter, the radio base station eNB transmits, to the mobile station UE, the downlink data addressed to the mobile station UE through the transmission opportunity in the downlink shared channel, and starts an Inactive timer A associated with the mobile station UE.

Here, a reception cycle of downlink data in the mobile station UE managed by the radio base station eNB is a continuous reception cycle.

In step S102, when receiving the above described downlink data, the mobile station UE operating in the continuous reception cycle starts an Inactive timer B, and transmits, through an uplink shared channel, a transmission acknowledgment signal (Ack) for the downlink data.

In step S103, upon occurrence of downlink data addressed to the mobile station UE, the radio base station eNB transmits a notification to the mobile station UE operating in the continuous reception cycle, through the L1/L2 control channel, the notification announcing an assignment of a transmission opportunity in the downlink shared channel for transmitting the downlink data addressed to the mobile station UE. Thereafter, the radio base station eNB transmits, to the mobile station UE through the above transmission opportunity in the downlink shared channel, the downlink data addressed to the mobile station UE, and restarts the Inactive timer A for the mobile station UE.

Here, the mobile station UE operating in the continuous reception cycle fails to receive the notification from the radio base station eNB through the L1/L2 control channel, and therefore cannot detect that the above described downlink data is transmitted. Thus, the mobile station UE can neither receive the downlink data nor transmit any transmission acknowledgment signal (Ack/Nack) for the downlink data.

On the other hand, in step S104, even though the mobile station UE transmits no transmission acknowledgment signal (Ack/Nack) for the above described downlink data, the radio base station eNB determines that a transmission acknowledgment signal (Ack) for the downlink data (a False Ack state) is received.

In step S105, since a Polling timer has expired before the Inactive timer A for the mobile station UE expires, the radio base station eNB restarts the Inactive timer A for the mobile station UE, and notifies the mobile station UE that the Polling timer has expired.

Then, in response to the above notification, the mobile station UE also restarts the Inactive timer B that is not yet expired.

As a result, both of a reception cycle of downlink data in the mobile station UE that is managed by the radio base station eNB, and a reception cycle of downlink data in the mobile station UE that is managed by the mobile station UE remain to be continuous reception cycles.

Accordingly, in step S106, upon occurrence of downlink data addressed to the mobile station UE, the radio base station eNB transmits a notification to the mobile station UE, operating in the continuous reception cycle, through the L1/L2 control channel, the notification announcing an assignment of a transmission opportunity in a downlink shared channel used for transmitting the downlink data addressed to the mobile station UE. Thereafter, the radio base station eNB transmits, to the mobile station UE through the above transmission opportunity in the downlink shared channel, the downlink data addressed to the mobile station UE, and restarts the Inactive timer A for the mobile station UE.

Here, in the present embodiment, since the Inactive timer B is restarted in step S105, the Inactive timer B is not yet expired in step S106. The mobile station UE is operating in the continuous reception cycle, and thus can transmit the above described downlink data, can restart the Inactive timer B, and can transmit a transmission acknowledgment signal (Ack) for the downlink data through the uplink shared channel.

Note that the above described operations of the mobile station UE and the radio base station eNB may be implemented by hardware, may be implemented by a software module executed by a processor, or may be implemented by a combination of both.

In more general term, software supporting radio protocols such as RRC, RLC, MAC and PHY are called protocol stacks (software pieces), and protocols (for example, PHY and MAC) of lower levels among those software pieces tend to be implemented into hardware in the form of semiconductor processors. Particularly in mobile stations UE, these protocols tend to be implemented into hardware in the form of semiconductor processors under the demands of miniaturization and electricity saving. Furthermore, also in small base stations (femto-cells and Home-eNBs), these protocols may be implemented into hardware in the form of semiconductor processors under the similar demands of miniaturization and electricity saving.

The software module may be provided inside a storage medium of any form, the storage medium being a RAM (Random Access Memory), a flash memory, a ROM (Read Only Memory), an EPROM (Erasable Programmable ROM), an EEPROM (Electronically Erasable Programmable ROM), a register, a hard disk, a removable disk, or a CD-ROM.

In order that a processor may read and write information from and to the above storage medium, the storage medium is connected to the processor. Alternatively, the above storage medium may be integrated into the processor. Additionally, these storage medium and processor may be provided inside an ASIC. This ASIC may be provided in each of mobile stations UE and the radio base station eNB. Alternatively, these storage medium and processor may be provided as discrete components in each of mobile stations UE and the radio base station eNB.

(Advantageous Effects of Mobile Communication System According to First Embodiment of the Present Invention)

According to the mobile communication system of the first embodiment of the present invention, the Inactive timer A provided in the radio base station eNB and Inactive timer B provided in the mobile station UE are set to expires later than a Polling timer provided in the radio base station eNB. Accordingly, it is possible to reduce a possibility of downlink data loss occurring due to disagreement between a reception cycle of downlink data in the mobile station UE that is managed by the reception cycle controller unit 31 of the radio base station eNB, and a reception cycle of downlink data in the mobile station UE that is managed by the reception cycle controller unit 14 of the mobile station UE.

Although the present invention has been described in detail by use of the above described embodiment, it will be apparent to those skilled in the art that the present invention is not limited by the embodiment described herein. The present invention can be implemented as corrected and modified aspects without departing from the spirit and scope of the present invention determined by description of the scope of claims. Accordingly, this description is given for the purpose of illustrative explanation, and has no restrictive implication on the present invention.

Note that entire contents of Japanese Patent Application No. 2007-121195 (filed on May 1, 2007) are incorporated herein by reference.

INDUSTRIAL APPLICABILITY

As has been described above, a reception cycle control method, radio base station and mobile station according to the present invention can reduce a possibility of downlink data loss occurring attributable to disagreement between "a reception cycle of downlink data in the mobile station UE" that is managed by the radio base station eNB, and "a reception cycle of downlink data in the mobile station UE" that is managed by the mobile station UE, and therefore, are beneficial in radio communications such as mobile communications.

The invention claimed is:

1. A reception cycle control method in which a mobile station and a radio base station control a downlink data reception cycle in the mobile station for downlink data to be transmitted from the radio base station to the mobile station, comprising the steps of:
   (A) starting, at the radio base station, a transmitting-side timer upon transmission of downlink data to the mobile station;
   (B) changing, at the radio base station, a reception cycle of downlink data in the mobile station, when transmitting no downlink data during a period from start to expiration of the transmitting-side timer;
   (C) starting, at the mobile station, a receiving-side timer upon receipt of downlink data transmitted from the radio base station; and
   (D) changing, at the mobile station, a reception cycle of downlink data in the mobile station, when receiving no downlink data during a period from start to expiration of the receiving-side timer; wherein
   upon transmission of a last piece of downlink data accumulated in a transmission buffer to the mobile station, the radio base station starts both of a Polling timer and the transmitting-side timer, the Polling timer set to expire earlier than the transmitting-side timer and the receiving-side timer;
   when the Polling timer expires, the radio base station notifies the mobile station of the expiration, and restarts the transmitting-side timer; and
   the mobile station restarts the receiving-side timer in response to the notification.

2. The reception cycle control method according to claim 1, wherein
   in the steps (B) and (D), the reception cycle of the downlink data in the mobile station is changed from a continuous reception cycle to a first discontinuous reception cycle.

3. The reception cycle control method according to claim 1, wherein
   in the steps (B) and (D), the reception cycle of the downlink data in the mobile station is changed from a first discontinuous reception cycle to a second discontinuous reception cycle set to be longer than the first discontinuous reception cycle.

4. A radio base station used in a-mobile communication system in which a mobile station is configured to start a receiving-side timer upon receipt of downlink data transmitted from a radio base station, and to change a reception cycle of downlink data in the mobile station when receiving no downlink data during a period from start to expiration of the receiving-side timer, the radio base station comprising:
   a transmitting-side timer manager unit configured to start a transmitting-side timer upon transmission of downlink data to the mobile station;
   a reception cycle controller unit configured to change the reception cycle of the downlink data in the mobile station, when no downlink data is transmitted during a period from start to expiration of the transmitting-side timer;
   a Polling timer manager unit configured to start a Polling timer set to expire earlier than the transmitting-side timer, when a last piece of downlink data accumulated in a transmission buffer is transmitted to the mobile station; and
   a notifying unit configured to notify, to the mobile station, expiration of the Polling timer, when the Polling timer expires; wherein
   the transmitting-side timer manager unit is configured to restart the transmitting-side timer, when the Polling timer expires.

5. The radio base station according to claim 4, wherein
   when no downlink data is transmitted during a period from start to expiration of the transmitting-side timer, the reception cycle controller unit is configured to change the reception cycle of the downlink data in the mobile station from a continuous reception cycle to a first discontinuous reception cycle.

6. The radio base station according to claim 4, wherein
   when no downlink data is transmitted during a period from start to expiration of the transmitting-side timer, the reception cycle controller unit is configured to change the reception cycle of the downlink data in the mobile station from a first discontinuous reception cycle to a second discontinuous reception cycle set to be longer than the first discontinuous reception cycle.

7. A mobile station used in a mobile communication system in which the radio base station is configured to start the transmitting-side timer upon transmission of downlink data to the mobile station, to change a reception cycle of downlink data in the mobile station when transmitting no downlink data during a period from start to expiration of the transmitting-side timer, to start a Polling timer upon transmission of a last piece of downlink data accumulated in a transmission buffer to the mobile station, and to notify, to the mobile station, expiration of the Polling timer when the Polling timer expires, the mobile station comprising:
   a receiving-side timer manager unit configured to start a receiving-side timer set to expire later than the Polling timer, when the mobile station receives downlink data transmitted from the radio base station; and
   a reception cycle controller unit configured to change the reception cycle of the downlink data in the mobile station, when no downlink data is received during a period from start to expiration of the receiving-side timer; wherein
   the receiving-side timer manager unit is configured to restart the receiving-side timer in response to the notification from the radio base station.

8. The mobile station according to claim 7, wherein
   when no downlink data is received during a period from start to expiration of the receiving-side timer, the reception cycle controller unit is configured to change the reception cycle of the downlink data in the mobile station from a continuous reception cycle to a first discontinuous reception cycle.

9. The mobile station according to claim 7, wherein
when no downlink data is received during a period from start to expiration of the receiving-side timer, the reception cycle controller unit is configured to change the reception cycle of the downlink data in the mobile station from a first discontinuous reception cycle to a second discontinuous reception cycle set to be longer than the first discontinuous reception cycle.

* * * * *